3,047,427
PAPER SUBSTRATE HAVING A COATING OF MINERAL PIGMENT, NATURAL ADHESIVE BINDER, AND HOMOPOLYMER OF BUTADIENE
Richard A. Dratz, Appleton, Wis., assignor to Kimberly-Clark Corporation, Neenah, Wis., a corporation of Delaware
No Drawing. Filed Nov. 17, 1958, Ser. No. 774,090
6 Claims. (Cl. 117—155)

The present invention is concerned with a cellulosic product and more particularly with a coated paper having improved printing characteristics and methods of manufacturing said paper.

The following symbolic diagram illustrates one embodiment of paper having a mineral coating in accordance with the invention:

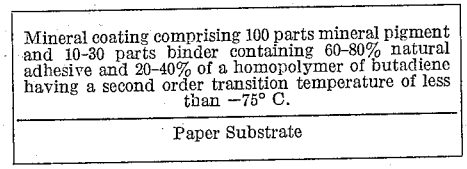

Mineral pigment coatings are applied to various types of papers. Those papers intended for the printing industry, in particular, are often coated to improve the appearance and printability of such papers. The coatings are primarily composed of a mineral pigment and of a binder. The pigments serve to make the paper surface more receptive to printing inks. The pigments are usually white, but colored pigments may also be used for decorative applications. Clay is the most commonly employed pigment although other pigments can be used. The primary purpose of the binder is to form a smooth, adherent coating which will uniformly bind the pigment particles to the paper. This is particularly important in printing papers because of the tendency of the printing ink to "pick" the coating from the paper during the printing operation. The binder in addition to binding the mineral pigment to the paper also acts to bond together the pigment particles and to control the receptivity and the penetration of the ink during the printing operation. Binders which are commonly used include casein, starches, and synthetic polymers. The mineral pigment coatings are usually prepared by mixing an aqueous dispersion of the finely ground mineral pigment with an aqueous dispersion or solution of the binder to form a coating composition which may typically have a water content of about 50 percent. The paper may then be coated with this aqueous coating composition by means of various coating apparatus such as roll, brush, knife, air knife, spray or intaglio-roll coating apparatus. The paper is then dried and usually calendered or supercalendered to provide a smooth, even surface.

Coated papers should have certain desirable properties. For example, the paper should have an attractive appearance and a smooth surface as well as physical resistance to abrasion, scuffing and folding. It should have a reasonable resistance to water, grease, solvents, and chemicals. It should have good stability so that upon aging the coating will not become brittle or discolor. For printing applications the coating should have good printability. This is one of the most important characteristics and includes good adhesion of the coating to the sheet surface, resiliency of the coating, and firm, non-tacky surface which will accept ink readily so that sharp, uniformly printed images are obtained. The coating should also be free of objectionable odor or taste and finally it must have a reasonable cost.

The principal improvement in coatings in recent years has been in the field of improved binders. Glue, which was the earliest binder used, has been largely supplanted by more modern binders such as starch, casein and synthetic polymeric materials such as butadiene-styrene and butadiene-acrylonitrile copolymers. While these modern binders have many advantages over the earlier binders there are also serious disadvantages, for example casein, which is obtained from cows milk has a susceptibility to insect infestation and to spoilage as well as a characteristic odor. It also has a high viscosity at moderate concentrations of solids so that the solids content of pigment which can be applied with a casein binder is relatively low. Starch has a relatively low adhesive strength and is water sensitive. The common synthetic polymers which usually consist of a mixture or copolymer of an elastomeric resin and a plastic resin overcome many of the disadvantages of the natural binders but have not proved completely satisfactory, particularly in papers used for rotogravure printing. Existing coated sheets are believed to be deficient in resilience and rotogravure ink receptivity. The ink receptivity is believed to be dependent on the proportion of pigment to binder in the coating and could be improved by binders capable of carrying a higher proportion of pigments. In addition the resin binders may be expensive, particularly where the synthetic resin is the sole adhesive component of the binder.

It is an object of the present invention to provide a coated paper which has substantially improved printability and in which the coating is characterized by having good gloss, smoothness, foldability and stability.

It is a further object of the present invention to provide a coating having improved resilience and printability.

It is a further object to provide an improved coating in which the binder component is relatively inexpensive.

I have found that these and other objects can be accomplished by employing a coating composition of a mineral pigment and a binder of a natural adhesive and a synthetic resin elastomer having a second order transition temperature of less than about $-75°$ C., such as polybutadiene.

Now while I do not wish to be bound by any theory advanced it is believed that the greatly improved results obtained with the coating composition of the present invention is primarily due to the use in the binder of the combination of a natural adhesive such as starch and a synthetic resin which has essentially purely elastomeric properties. The degree of the elastomeric behavior of resinous polymers may be best described by reference to the second order transition temperature of the polymer. Substantially all polymers may be changed from a rubbery to a plastic state by an increase in temperature. As pointed out by D'Alelio in Fundamentals of Polymerization, Wiley, 1952, page 122, most polymers have a well defined softening point which may be determined by plotting a primary thermodynamic property of the polymer such as volume against temperature. There is a discontinuity of the first derivative of the property which occurs at a characteristic temperature $T_m$,° C., which is usually referred to as the second order transisition temperature. It has been found that most plastics have a $T_m$ above plus 50° C., whereas most of the important rubbers have a $T_m$ less than $-40°$ C., for example, polystyrene has a $T_m$ of 81° C., and natural rubber containing 8 percent sulfur has a $T_m$ of $-63°$ C. Polymers having both elastomeric and plastic properties may be made by a copolymerization of various monomers or by mixtures of monomers and plasticizers or by employing polymers having second order transition temperatures of an intermediate range. For example, a copolymer of 50 mole percent styrene in butadiene has a $T_m$ of $-50°$ C., and 25 mole percent styrene in butadiene has a $T_m$ of —61° C. A typical copolymer of butadiene with acrylonitrile has a $T_m$ value of —23° C. Coatings for papers containing a pigment have heretofore employed a resin having both elastomeric and plastic properties and characterized by second order transition temperatures in the intermediate range such as butadiene-styrene, butadiene-acrylonitrile, and various acrylate compositions. It was thought that the presence of a plastic component of the polymer was necessary in order to impart moldability to the coating and to avoid excessive tackiness.

Now it has been found in accordance with the present invention that a resin component having a second order transition temperature of —75° C., or less, can be employed as the resin component of the coacting composition by mixing a minor proportion of the resin component with a major proportion of a natural adhesive to form the binder of the coating. Homopolymers such as polybutadiene having a second order transition temperature of —85° C., can be employed as the sole constituent of the resin component of the binder. The resultant binder has relatively low viscosity and excellent adhesive properties, presumably because of the purely elastomeric character of the resin employed and is capable of carrying pigments in an amount as much as 8 to 10 times the weight of the binder solids. In addition to the improved binder to pigment ratio which is made possible by employing a natural adhesive-butadiene binder, the coating has greatly improved resiliency. This also is a result of the use of a resin having essentially elastomeric properties rather than the previously used resins having elastomeric and plastic properties. Because of the higher pigment to binder ratio which the resin coating composition is capable of carrying and because of this improved resiliency, paper coated with the coating of the present invention has greatly improved printability which is particularly apparent when employed with rotogravure printing process.

The preferred resin component of the binder is one consisting essentially of a homopolymer of polybutadiene. The butadiene homopolymer is particularly desirable because of the freedom from the objectional odor, which is associated with such resin blends as butadiene-styrene. Synthetic polybutadiene latices obtainable from commercial sources are suitable. Such commercially available synthetic latices usually contain about 55–60 percent total solids, have a pH on the alkaline side and a surface tension of the order of 500–600 centipoises. The polymerization of butadiene is normally carried out by heating the butadiene monomer in the presence of water containing an ionic emulsifying agent and a catalyst at temperatures of the order of 50–100° C. The polymerization mixture is usually maintained on the alkaline side.

The binder of the coating of the present invention is composed of the resin component and a natural adhesive. The natural adhesives which are commonly used as binders in coating compositions may be used. These include casein, starches, and soya protein. Any of the conventional starches employed in paper coatings such as potato starch, soya starch, corn starch, tapioca or sago starch may be employed. Preferable starches are those which have been oxidized or modified by treatment with such oxidizing agents as hypochlorites. Starches may alternatively be modified by heat conversion or by enzyme action.

The most common mineral pigment component of coating compositions are the clays which are available commercially for use in coating compositions. The clays which are suitable for employment in the present coating are kaolin or similar minerals which are ground to a fine particle size. In the case of regular coating clay 75 percent of the particles are less than 2 microns in diameter and 97 percent less than 5 microns; in premium clays the respective percentages are 94 percent and 100 percent and in supreme English 97 percent and 100 percent. Other white pigments which may be employed include calcium carbonate, satin white, titanium dioxide, blanc fixe, lithopone, etc. Conventional colored pigments may also be employed where a colored surface is desired.

The coating composition is preferably prepared by mixing together an aqueous dispersion of the pigment and an aqueous solution of the starch. Modified starch dispersions may be converted into solutions by cooking the aqueous dispersion of the starch. Usually sufficient water is employed to insure an aqueous solution containing 20 to 40 percent starch solids.

When the pigment and starch have been thoroughly mixed the polybutadiene as a latex may be added to the mixture and dispersed throughout the mixture. The proportion of binder solids to pigment solids where the coating is to be used for printing papers will normally vary between about 10 and 30 parts binder solids per 100 parts of pigment solids. Twelve to 20 parts of binder solids per 100 parts of pigment solids are preferred for rotogravure and letterpress paper coatings. The binder will normally contain between about 20 and 40 percent latex solids with 25 to 30 percent latex preferred for letterpress and rotogravure printing paper.

Various other conventional agents may be incorporated in the coating composition. For example, wax or soap may be incorporated in coatings to be used on papers which are to be friction finished, as by supercalendering. The waxes most commonly used are of the emulsified paraffinic type. The soaps normally used are of the saponified stearic acid type.

The paper may be coated by the usual coating machinery such as roll coaters, brush coaters, knife coaters, air knife coaters and spray coaters. Coatings having a solids content of 50 to 65 percent are normally employed although the water content may be varied much more widely for particular applications.

Now that the process has been generally described it may be further illustrated by the following examples which are for illustration only and not to be construed as limiting the scope of the invention.

*Example 1*

A coating for rotogravure printing paper was prepared as follows, 50 pounds of coating clay, 17 pounds of calcium carbonate and 33 pounds of premium clay were dispersed in 40 pounds of water with a commercial sodium metaphosphate composition, sold under the trademark "Calgon" and caustic in a kneader. A modified corn starch with a fluidity of 90 was cooked with water to solubilize the corn starch. Thirty pounds of the starch solution containing 12 pounds of starch solids was then added to the clay dispersion and thoroughly mixed therewith. Two pounds of emulsified wax containing 50 percent of solids was added to the dispersion. A polybutadiene latex having a resin solids content of 58.3 percent, a pH of 10.4 and a viscosity of 170 centipoises as determined with the Brookfield viscometer, spindle No. 1 at 20 r.p.m., was then stabilized with 2 percent by weight of ammoniated casein on the basis of latex solids. Five pounds of the latex was added to the starch clay dispersion and thoroughly mixed therewith. The resultant coating was adjusted to a water content of 38 percent. This coating was applied to both sides of a base sheet containing 55 percent groundwood, 25 percent sulfite pulp and 20 percent kraft pulp, with a trailing knife coater to a total weight of 10½ pounds per ream (5¼ pounds per side). The ream size was 3300 square feet. The coated paper was dried and then super-calendered to a finish of 47 as measured on an Ingersoll glarimeter. Samples of the paper were printed with a standard rotogravure plate and then compared with similar printed sheets made from paper coated with conventional starch binder coatings. The prints were judged and graded on a 1–10 scale with the grade of 1 being the highest grade. The rotogravure sheets incorporating the composition of the present invention were consistently graded 1 to 1.2 whereas sheets coated with straight starch coatings were graded 2.5 to 3.0. In addition to the improved printability of the paper, the coating was free of odor and taste, and the paper had attractive appearance and good resistance to abrasion, scuffing, folding, etc.

*Example 2*

Sixty-seven pounds of coating clay and 33 pounds of premium clay were dispersed in 40 pounds of water with Calgon and caustic. The clay dispersion was then mixed with a water solution of a modified starch containing 9 pounds of starch solids. One pound of soap was dissolved in water and this soap solution was added to the starch-clay dispersion. Eight pounds of a polybutadiene latex having the same characteristics as the latex used in the previous example was stabilized with ammoniated casein, and then added to the above dispersion. The dispersion was adjusted with water to a 56 percent solids content and then applied with a roll coater to a base sheet containing 60 percent groundwood, 10 percent hardwood sulfite, and 30 percent kraft. Thirteen pounds (total weight of the coating on two sides) per ream (3300 square feet) was applied to the paper using a Kimberly-Clark-Mead roll coater. The paper was dried and then supercalendered. The resultant rotogravure paper had good appearance, brightness and excellent printability.

*Example 3*

A coating for use on a web-fed offset sheet was prepared in the following way, 50 pounds of premium clay and 50 pounds of regular coating clay were dispersed in 40 pounds of water with Calgon and ammonium hydroxide. A slurry of 14 pounds of casein solids in water, solubilized with ammonium hydroxide was then mixed with the clay dispersion and to this solution was added 3 pounds of emulsified wax (50 percent solids). The polybutadiene latex containing 58.9 percent solids and stabilized with ammoniated casein, was then added to the dispersion in an amount of 10 pounds of latex. The water content of the dispersion was then adjusted to 50 percent and the coating applied to a 44 pound base sheet containing 25 percent sulfite and 75 percent kraft on a two side roll coater to a weight of 16 pounds of coating per ream (3300 square feet) and the paper then dried and supercalendered. The paper had good gloss, resistance to water, flexibility, printing properties, and superior resistance to pick.

*Example 4*

A coating suitable for use on paper for letter-press or offset printing was prepared by forming a clay dispersion of 35 pounds of coating clay, 35 pounds of English clay, 24 pounds of calcium carbonate, and 6 pounds titanium dioxide dispersed in 40 pounds of water. To this clay composition was then added 20 pounds of solids of a modified starch dissolved in water. The resultant starch clay coating was then applied as a base coat to a 50 pound paper base sheet made of a furnish consisting of 22 percent sulfite and 78 percent kraft. The coating was applied on a two sided coater to a total weight of the base coat of 13 pounds per ream (3300 square feet). The base coat was then dried and a top coating of 17 pounds per ream was applied. The top coating which had been prepared in the same manner as the preceding coatings consisted of 45 pounds of English clay, 30 pounds of premium clay, 25 pounds of hydrated alumina, 14 pounds of solids of a modified starch, 6 pounds of an orthoprotein and 8½ pounds of a polybutadiene latex having a solids content of 58.9 percent. After coating with the second coat the paper was dried and then supercalendered. The coated paper had a high gloss, excellent printability and good reflectance.

While there have been described certain embodiments of this invention it is to be understood that it is capable of many modifications. Changes therefore may be made without departing from the spirit and scope of the invention as described in the appended claims in which it is the intention to claim all novelty inherent in the invention as broadly as possible in view of the prior art.

What is claimed is:

1. A printing paper having a coating of 100 parts of mineral pigment and 10–30 parts of a binder, said binder containing on a solids basis 80–60 weight percent of a natural adhesive selected from the group consisting of casein, starches, and soya protein and 20–40 percent of a homopolymer of butadiene having a second order transition temperature of less than −75° C.

2. The paper of claim 1 wherein the natural adhesive is a starch.

3. The paper of claim 1 wherein the natural adhesive is casein.

4. The paper of claim 1 wherein the natural adhesive is a protein.

5. A method of producing a mineral coated paper having good ink receptivity and coating resiliency which comprises coating at least one side of a paper sheet with an aqueous dispersion containing 100 parts of a mineral pigment, and 10–30 parts of binder solids, said binder comprising a natural adhesive selected from the group consisting of casein, starches, and soya protein and from 20–40 percent of the weight of the solids of said binder of a homopolymer of butadiene, characterized by a second order transition temperature of less than −75° C.

6. A coated rotogravure paper having a coating of 100 parts of mineral pigment, and 12–20 parts of a binder solids, said binder comprising a modified corn starch and a homopolymer of butadiene in an amount of 25–30 percent of the solids content of said binder, said homopolymer of butadiene characterized by a second order transition temperature of less than −75° C.

References Cited in the file of this patent

UNITED STATES PATENTS

| | | |
|---|---|---|
| 2,281,613 | Wollthan et al. | May 5, 1942 |
| 2,416,232 | Soday | Feb. 18, 1947 |
| 2,577,624 | Niles | Dec. 4, 1951 |
| 2,651,580 | Reilly | Sept. 8, 1953 |
| 2,656,286 | Fisher et al. | Oct. 20, 1953 |
| 2,685,538 | Stinchfield et al. | Aug. 3, 1954 |
| 2,759,847 | Frost et al. | Aug. 21, 1956 |
| 2,790,735 | McLaughlin et al. | Apr. 30, 1957 |
| 2,790,736 | McLaughlin et al. | Apr. 30, 1957 |
| 2,874,066 | McLaughlin et al. | Feb. 17, 1959 |

FOREIGN PATENTS

| | | |
|---|---|---|
| 542,780 | Canada | June 25, 1957 |